United States Patent
Garello

(10) Patent No.: US 8,072,102 B2
(45) Date of Patent: Dec. 6, 2011

(54) STATOR OF A TURBO GENERATOR

(75) Inventor: Roberto Garello, Genoa (IT)

(73) Assignee: Ansaldo Energia S.p.A., Genoa (IT)

( * ) Notice: Subject to any disclaimer, the term of this patent is extended or adjusted under 35 U.S.C. 154(b) by 185 days.

(21) Appl. No.: 12/309,331

(22) PCT Filed: Jul. 16, 2007

(86) PCT No.: PCT/EP2007/057340
§ 371 (c)(1),
(2), (4) Date: Jul. 28, 2009

(87) PCT Pub. No.: WO2008/006913
PCT Pub. Date: Jan. 17, 2008

(65) Prior Publication Data
US 2009/0322168 A1    Dec. 31, 2009

(30) Foreign Application Priority Data

Jul. 14, 2006  (EP) .................................... 06425484

(51) Int. Cl.
*H02K 11/00*     (2006.01)
(52) U.S. Cl. .......... 310/71; 310/179; 310/180; 310/184; 310/201
(58) Field of Classification Search .................... 310/71, 310/179, 180, 184, 201; *H02K 11/00*
See application file for complete search history.

(56) References Cited

U.S. PATENT DOCUMENTS

| | | | |
|---|---|---|---|
| 3,753,013 A * | 8/1973 | Beermann et al. | 310/54 |
| 3,980,910 A * | 9/1976 | Steinebronn et al. | 310/71 |
| 4,072,873 A * | 2/1978 | Nottingham | 310/71 |
| 4,115,915 A * | 9/1978 | Godfrey | 29/596 |
| 4,199,700 A | 4/1980 | Daugherty et al. | 310/71 |
| 4,321,497 A * | 3/1982 | Long | 310/198 |
| 4,642,498 A | 2/1987 | Archibald et al. | 310/71 |
| 4,803,028 A * | 2/1989 | Torossian et al. | 264/263 |
| 4,894,575 A * | 1/1990 | Nilsson et al. | 310/260 |
| 5,196,752 A * | 3/1993 | Palma | 310/260 |

(Continued)

FOREIGN PATENT DOCUMENTS

CN    1187708 A    7/1998

(Continued)

OTHER PUBLICATIONS

English translation of an Office Action dated Jan. 26, 2011 for corresponding Chinese Application No. 200780030164.7.

*Primary Examiner* — Quyen Leung
*Assistant Examiner* — John K Kim
(74) *Attorney, Agent, or Firm* — Ohlandt, Greeley, Ruggiero & Perle, L.L.P.

(57) ABSTRACT

A stator of a turbo generator for the generation of electrical energy is provided with: a cylindrical core, which extends along a longitudinal axis and presents a plurality of axial cavities and two opposite headers; connection terminals of the turbo generator; a plurality of electrical windings, which are split into groups and which extend along paths defined in part in the axial cavities and in part at the headers; the electrical windings of each group being isopotential and connected in parallel between a pair of terminals; and a plurality of connection devices, each of which is adapted to define, at least at one of the headers, a segment of path in common with the isopotential electrical windings.

23 Claims, 4 Drawing Sheets

U.S. PATENT DOCUMENTS

| | | | |
|---|---|---|---|
| 5,332,939 A * | 7/1994 | Fanning et al. | 310/71 |
| 6,211,586 B1 * | 4/2001 | Hediger et al. | 310/52 |
| 6,891,303 B2 * | 5/2005 | Leijon et al. | 310/196 |
| 2006/0125343 A1 * | 6/2006 | Ward | 310/260 |
| 2009/0322168 A1 * | 12/2009 | Garello | 310/71 |

FOREIGN PATENT DOCUMENTS

| | | |
|---|---|---|
| EP | 0375419 A2 | 6/1990 |
| JP | 61081151 | 4/1986 |
| JP | 4265614 | 9/1992 |

* cited by examiner

STATOR OF A TURBO GENERATOR

TECHNICAL FIELD

The present invention relates to a stator of a turbo generator.

In particular, the present invention relates to a stator of a high power turbo generator for the generation of electrical energy to which specific reference will be made in the present description without for this loosing in generality.

BACKGROUND ART

High power turbo generators for the generation of electrical energy have evolved in the perspective of increasing unitary power, which, in turn, requires to increase electrical currents, and consequently requires to increase stator cooling.

Generally, the stator of a turbo generator comprises: a cylindrical core, which extends along a first longitudinal axis and comprises a plurality of axial cavities and two opposite headers; connection terminals of the turbo generator; a plurality of electrical windings, which are split into groups and which extend along paths defined in part in the axial cavities and in part at the headers; the electrical windings of each group being isopotential and connected in parallel between a pair of terminals.

A known stator of a three-phase turbo generator comprises six terminals (three of which are connected to earth and three of which are connected to the electrical energy distribution main), nine electrical windings which are split into three groups each comprising three isopotential electrical windings connected in parallel between a pair of terminals; seventy-two cavities, each of which is occupied at the same time by two different portions of electrical windings. The electrical windings have straight segments accommodated in the cavities and connection segments, which are arranged at the headers and which have the function of connecting together the straight segments arranged in different axial cavities and some straight segments to the terminals.

Considering that, according to the wiring diagram of the stator described above, each axial cavity is occupied at the same time by two different electrical windings and that each electrical winding presents a path essentially identical to the other electrical windings, each electrical winding presents sixteen straight segments, which are arranged at corresponding axial cavities, and a plurality of connection segments, which are adapted to connect the straight segments to each other and to the terminals, and are arranged at the headers.

The connection segments determine a considerable axial dimension at the header of the stator, above all considering that the electrical windings are generally defined by bars which must be maintained spaced apart one from the other. Furthermore, the axial dimension of the stator is increased by the wiring configuration followed by the electrical windings: indeed, in an electrical winding it is often necessary to connect together two straight segments arranged in diametrically opposite axial cavities.

The technical solution of forming isopotential electrical windings between a pair of terminals, rather than a single electrical winding between a pair of terminals, allows to decrease the current value in the single isopotential electrical windings; to increase the cooling surface; and to reach higher unitary powers with respect to traditional electrical windings and for a given ventilating gas. The currently known solutions envisage the formation of two or three isopotential electrical windings connected in parallel between each pair of terminals.

The stators which adopt this type of solution, i.e. of fractioning the electrical windings of the stator, in addition to the aforementioned drawback of the axial dimensions due to the high number of connection segments at the headers, present the drawback of overloading with electrical current the connection zones of the electrical windings to the terminal pair to which they lead.

In order to obviate to this drawback, each isopotential electrical winding is connected to a respective terminal by means of a ventilated connection device which, in turn, determines a further increase of axial dimensions.

DISCLOSURE OF INVENTION

It is the object of the present invention to make a stator of a turbo generator which reduces the axial dimensions of the stator and which simply and cost-effectively solves the highlighted drawbacks of the known art.

According to such objects, the present invention relates to a stator of a turbo generator for the generation of electrical energy; the stator comprising: a cylindrical core, which extends along a longitudinal axis and comprises a plurality of axial cavities and two opposite headers; connection terminals of the turbo generator; a plurality of electrical windings, which are split into groups and which extend along paths defined in part in the axial cavities and in part at the headers; the electrical windings of each group being isopotential and connected in parallel between a pair of terminals; the stator being characterised by comprising a plurality of connection devices, each of which is adapted to define, at least at one of the headers, a segment of path in common with the isopotential electrical windings.

In this way, the connection devices allow to reduce the number of connection segments and, consequently, the dimensions of the stator at the headers.

BRIEF DESCRIPTION OF THE DRAWINGS

Further features and advantages of the present invention will be apparent in the description that follows of a non-limitative embodiment, with reference to the accompanying drawing, in which.

BEST MODE FOR CARRYING OUT THE INVENTION

Figure 1:
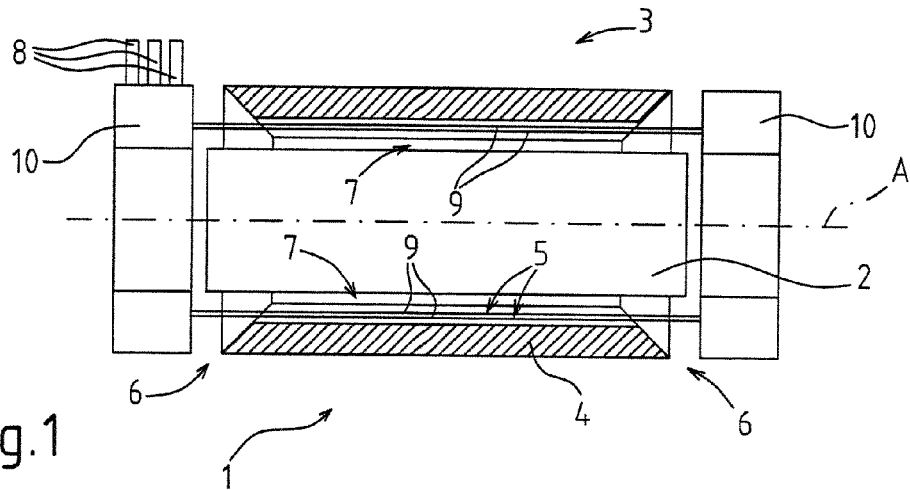
FIG. 1 is a schematic longitudinal view, with parts removed for clarity, of a turbo generator for the generation of electrical energy made according to the present invention.

With reference to FIG. 1, number 1 indicates as a whole a three-phase turbo generator, which extends along a longitudinal axis A and comprises a rotor 2, which is the mobile inductor, and a stator 3, which the fixed armature of the turbo generator 1.

Rotor 2 is essentially cylindrical and turns, moved by a turbine (not shown), about its axis, which coincides with longitudinal axis A of turbo generator 1. Stator 3 is essentially shaped as a hollow cylinder coaxial to rotor 2, extends around rotor 2 and is separated from rotor 2 by a gap.

Stator 3 comprises a cylindrical core 4; electrical windings 5, each of which is crossed by an induced current; and presents two opposite headers 6.

Figure 2:
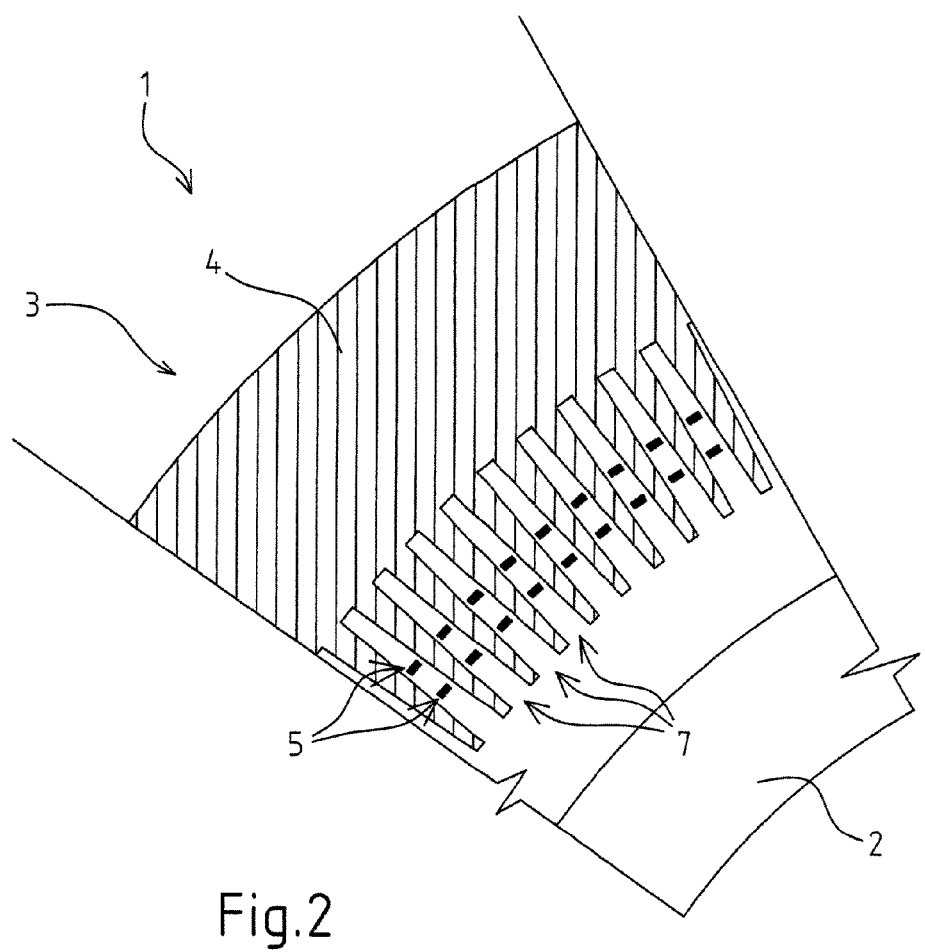
FIG. 2 is a sectional schematic view with parts removed for clarity and magnified, of the turbo generator in FIG. 1.

With reference to FIG. 2, cylindrical core 4 extends around longitudinal axis A and presents a plurality of axial grooves, called cavities 7, which extend for the entire length of the cylindrical core 4; face rotor 2; and are uniformly distributed about axis A (not shown in FIG. 2).

With reference to FIG. 1, turbo generator 1 comprises six terminals 8 (only three of which are shown in FIG. 1) connecting turbo generator 1 to the outside. Terminals 8 are arranged at one header 6 of the stator 3. In the case in point, three terminals 8 are connected to earth, while the other three terminals 8 are connected to the electrical energy power main. In particular, stator 3 comprises nine electrical windings 5, which are split into three groups, each of which comprises three isopotential electrical windings 5 connected in parallel. Each group of isopotential electrical windings 5 connected in parallel leads to two corresponding terminals 8.

Each electrical winding 5 extends between two terminals 8 along a path defined in part within cavities 7 and in part at headers 6. In particular, each electrical winding 5 is arranged according to a predetermined wiring diagram with envisages that each winding 5 presents sixteen straight segments 9 arranged in different cavities 7 and connection segments 10 for connecting the straight segments 9 to each other and for connecting the straight segments 9 to terminals 8. In FIG. 1, connection segments 10 are indicated as a whole by two annular coils arranged at the headers 6.

Figure 3:
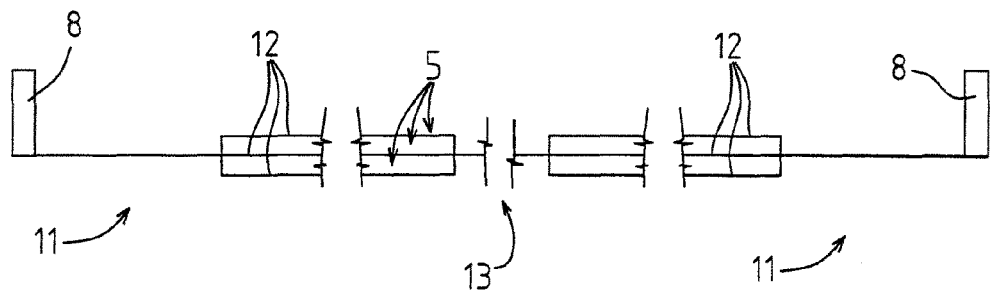
FIG. 3 is a schematic view of a group of isopotential windings.

With reference to FIG. 3, each of the three electrical windings 5 comprises in sequence and from the left to the right a terminal connection device 11 connected to a terminal 8; a bar 12; an intermediate connection device 13; a further bar 12 and a further terminal connection device 11 connected to a further terminal 8. The three isopotential electrical windings 5 of each group present segments in common defined by the two terminal connection device 11, by intermediate connection device 13 and by separate segments which are defined by bars 12.

Figure 4:
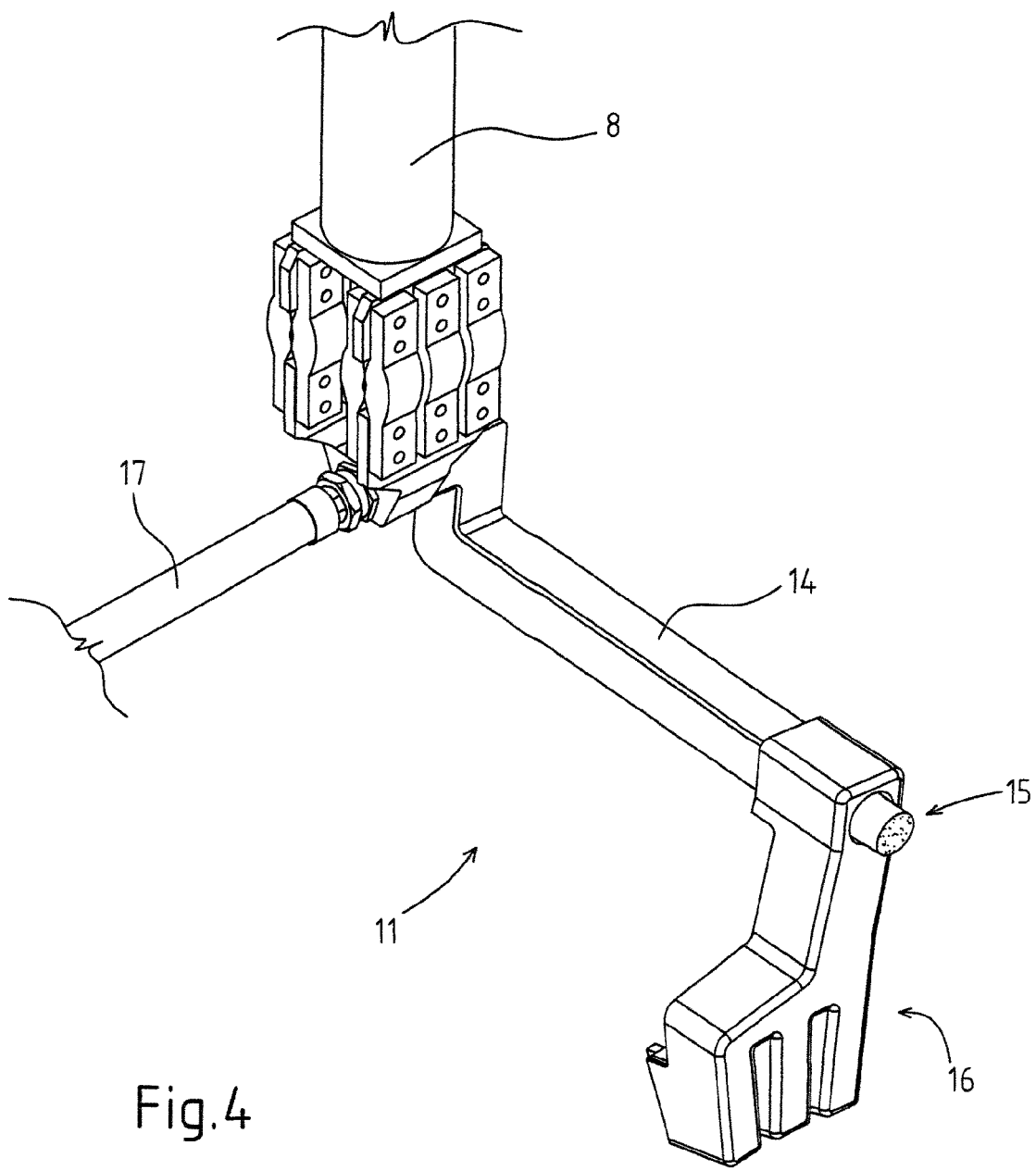
FIG. 4 is a perspective view, with parts removed for clarity, of a connection device of the turbo generator in FIG. 1.

With reference to FIG. 4, each terminal connection device 11 comprises a hollow conductor 14, which presents an essentially square cross-section, a first end connected to a terminal 8, and a second end enclosed by a filter 15 which allows the circulation of gas within the conductor 14; a connector 16 arranged about conductor 14 at the second end of conductor 14; a suction tube 17, which is connected to the first end of conductor 14 to connect the internal compartment of conductor 14 to a vacuum zone of stator 3, not shown in the attached figures.

Figure 5:
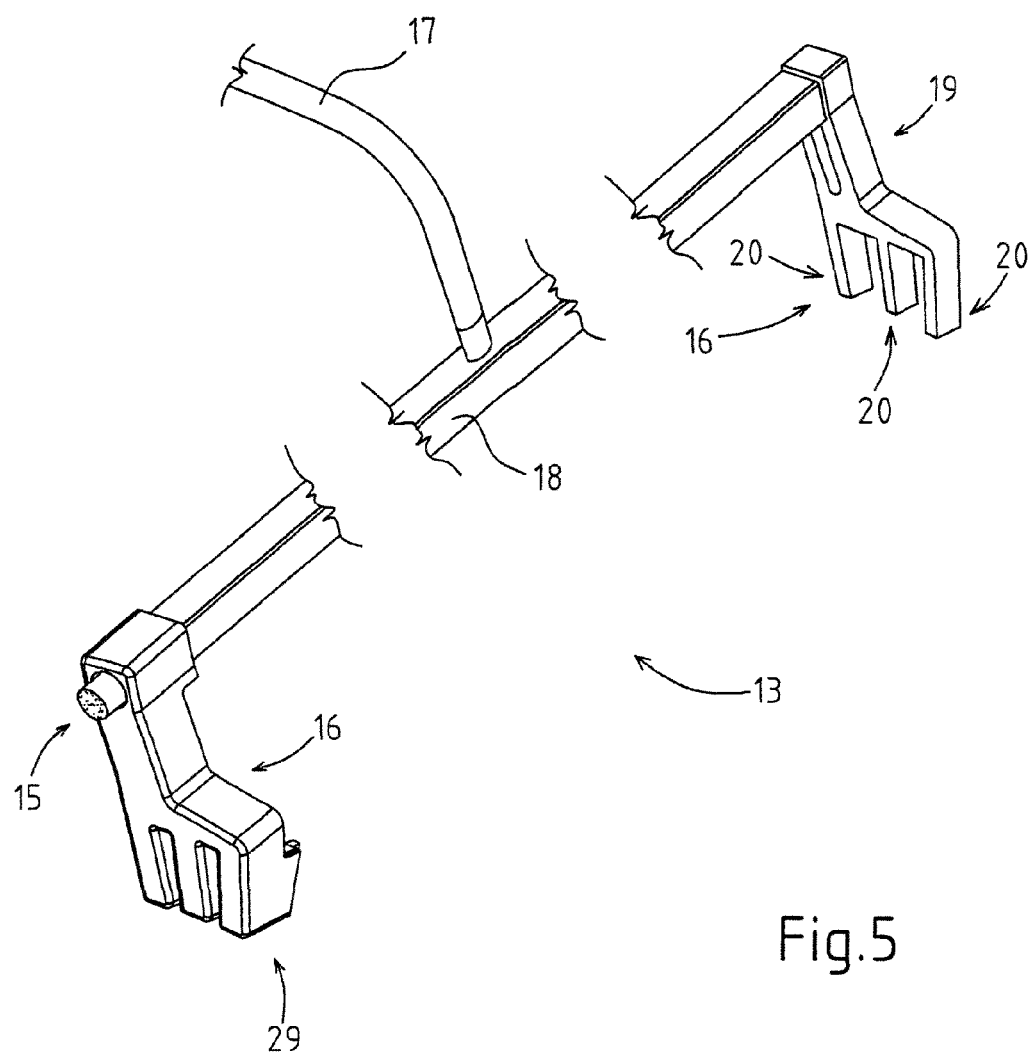
FIG. 5 is a perspective view, with parts removed for clarity, of a further connection device of the turbo generator in FIG. 1.

With reference to FIG. 5, intermediate connection device 13 comprises a hollow conductor 18, which presents an essentially square cross-section and extends between a first and a second end, each of which presents a filter 15 and supports a connector 16. Intermediate connection device 13 comprises a suction tube 17 connected to conductor 18 in the middle of conductor 18 so as to connect the inside of conductor 18 to a vacuum zone of stator 3 and to aspirate a ventilating fluid through filters 15.

In FIGS. 4 and 5, hollow conductors 14 and 18 are respectively shown in essentially straight configurations for the sake of simplicity, it being understood that hollow conductors 14 and 18 may assume any configuration, for example straight, inclined, curved or any combination of the above-mentioned configurations, which best meets the axial dimensions reduction need of stator 3. Generally, hollow conductors 14 and 18 present at least one arc-shaped curved portion arranged about axis A.

Figure 6:
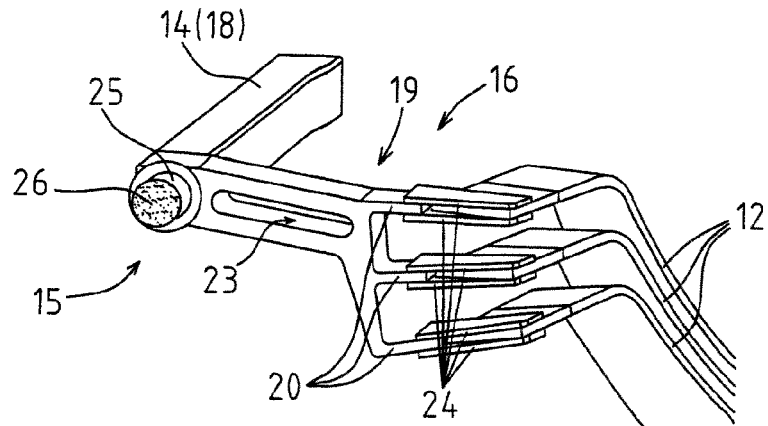
FIG. 6 is a perspective view, with parts removed for clarity, of a detail of a connection device of the turbo generator in FIG. 1.

With reference to FIG. 6, the connection between connector 16, bars 12 and a hollow conductor is shown in greater detail, being either the hollow conductor 14 of connection device 11 or the conductor 18 of intermediate connection device 13.

Connector 16 comprises an elongated body 19, preferably made of solid copper, and three fins 20 which protrude from elongated body 19. Elongated body 19 on the band opposite fins 20 presents a hole 21 (FIG. 7) adapted to accommodate an end portion of conductor 14 (18) and filter 15. Such end portion presents a circular cross-section and is adapted to form a connection with connector 16.

Figure 7:
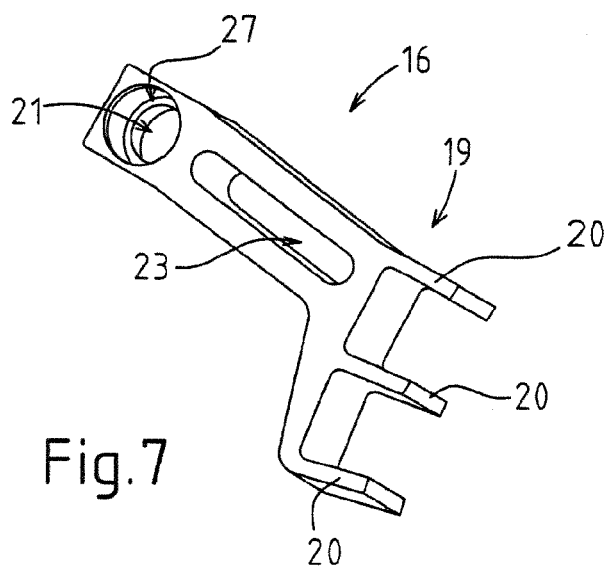
FIG. 7 is a perspective view, with parts removed for clarity, of a detail of the connection device in FIG. 6.

With reference to FIG. 7, elongated body 19 is crossed by a slot 23 which extends between hole 21 and fins 20 so as to increase the heat exchanging surface and the distribution of current crossing connector 16.

With reference to FIG. 6, each fin 20 is adapted to be connected to a corresponding conducting bar 12. In the attached figures, three fins 20 for connecting to respecting conducting bars 12 are shown by the way of example, it being understood that a connector 16 comprising any number (at least 2) of fins 20 can be made.

Each fin 20 is fixed to bar 12, preferably by brazing to a pair of metallic plates 24. Fins 20 are adaptable to the position of each conducting bar 12.

Figure 8:
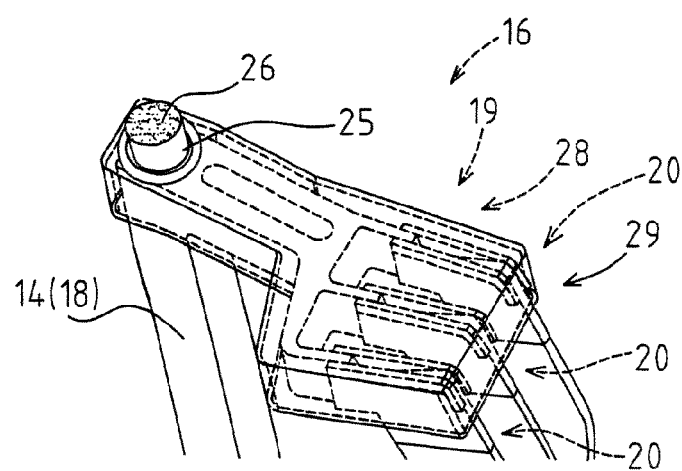
FIG. 8 is a perspective view, with parts removed for clarity, of a detail of a connection device of the turbo generator in FIG. 1.

With reference to FIGS. 6 and 8, suction filter 15 comprises a cylindrical tube 25 preferably made of fibreglass, a first end of which engages hole 21 and a second end being closed by a perforated plate 26. The first end of suction filter 15 which engages hole 21 is abuttingly arranged against a shoulder 27 (FIG. 7) of hole 21 and is fixed to elongated body 19 with epoxy resin.

The end of hollow conductor 14 or hollow conductor 18 is fixed to connector 16 by melting a ring of brazing material, not shown, arranged at the end and inserted in hole 20.

With reference to FIG. 7, connector 16 comprises a first shell 28 and a second shell 29, both made of fibreglass. The first shell 28 is insulating and arranged about elongated body 19 and fins 20, while the second insulating shell 29 is arranged about the first insulating shell 28. The two shells 28 and 29 are shaped so as not to be entirely closed at conducting bars 12 and hollow conductor 14 (18), and furthermore the connection to connector 16 is made by spots. The two shells 28 and 29 are open and form a ventilation chamber about elongated body 19 and fins 20.

Furthermore, the two shells 28 and 29 present a hole at the suction filter 15 and further secure filter 15 to elongated body 19.

Stator 3 according to the present invention presents the following advantages: the use of terminal connection devices 11 and of intermediate connection devices 13 reduces the axial dimensions at one of headers 6; direct ventilation is limited only to terminal connection devices 11 and to intermediate connection devices 13 thus reducing the axial dimensions; and the reduced number of connection segments allows better accessibility to components of stator 3 consequently better assembly precision.

Specific reference was made in the description to an embodiment with three isopotential electrical windings, it being understood that the present invention relates in general to any number of isopotential electrical windings.

The invention claimed is:

1. A stator of a turbo generator, comprising:
   a cylindrical core, which extends along a longitudinal axis and comprises a plurality of axial cavities and two opposite headers;
   first connection terminals of the turbo generator configured to be connected to ground;
   second connection terminals of the turbo generator configured to be connected to electrical power main;
   a plurality of electrical windings, which are split into groups and which extend along paths defined in part in the axial cavities and in part at the headers;
   the electrical windings of each group being isopotential and connected in parallel between the first and second connection terminals; and
   a plurality of connection devices, each of which is adapted to define, at least at one of the headers, a segment of path in common with the isopotential electrical windings,
   wherein the connection devices comprise:
   terminal connection devices, each of which is connected to one of the first connection terminals or to one of the second connection terminals and defines a segment in common to the isopotential electrical windings of a group:
   intermediate connection devices, each of which defines a segment in common to isopotential electrical windings of a group and are arranged in a median portion of the isopotential electrical windings; and
   each group of isopotential electrical windings comprises in sequence a first terminal connection device; at least two first conducting bars; an intermediate connection device; at least two second conductive bars; and a second terminal connection device.

2. The stator according to claim 1, wherein each connection device comprises a hollow conductor.

3. The stator according to claim 2, wherein the hollow conductor is connected to a suction tube adapted to ventilate said hollow conductor.

4. The stator according to claim 2, wherein the hollowing conductor presents at least one end provided with a suction filter.

5. The stator according to claim 4, wherein the suction filter comprises a tube enclosed in a perforated plate.

6. The stator according to claim 2, wherein the connection device comprises at least one connector adapted to connect the hollow conductor to at least two bars.

7. The stator according to claim 6, wherein the connector comprises an elongated body provided with a hole adapted to be engaged by said hollow conductor and at least two fins each of which is adapted to be brazed to a corresponding bar.

8. The stator according to claim 7, wherein the connector comprises a first insulating shell arranged about the elongated body and the fins.

9. The stator according to claim 8, wherein the connector comprises a second shell arranged about the first shell.

10. The stator according to claim 7, wherein the elongated body presents a slot which extends between the hole and the fins.

11. The stator according to claim 2, wherein the intermediate connection device comprises two connectors arranged on the two opposite ends of the hollow conductor.

12. The stator according to claim 11, wherein the connection device comprises two filters arranged on the opposite ends of the hollow conductor.

13. The stator according to claim 12, further comprising a suction tube connected to the hollow conductor at the middle line of the hollow conductor.

14. A stator of a turbo generator, comprising:
   a cylindrical core, which extends along a longitudinal axis and comprises a plurality of axial cavities and two opposite headers;
   connection terminals of the turbo generator;
   a plurality of electrical windings, which are split into groups and which extend along paths defined in part in the axial cavities and in part at the headers;
   the electrical windings of each group being isopotential and connected in parallel between a pair of terminals; and
   a plurality of connection devices, each of which is adapted to define, at least at one of the headers a segment of path in common with the isopotential electrical winding,
   wherein each connection device comprises a hollow conductor having one end provided with a suction filter.

15. The stator according to claim 14, wherein the suction filter comprises a tube enclosed in a perforated plate.

16. A stator of a turbo generator, comprising:
   a cylindrical core, which extends along a longitudinal axis and comprises a plurality of axial cavities and two opposite headers;
   connection terminals of the turbo generator;
   a plurality of electrical windings, which are split into groups and which extend along paths defined in part in the axial cavities and in part at the headers;
   the electrical windings of each group being isopotential and connected in parallel between a pair of terminals; and
   a plurality of connection devices, each of which is adapted to define, at least at one of the headers, a segment of path in common with the isopotential electrical winding,
   wherein each connection device comprises a hollow conductor and at least one connector adapted to connect the hollow conductor to at least two bars.

17. The stator according to claim 16, wherein the connector comprises an elongated body provided with a hole adapted to be engaged by said hollow conductor and at least two fins each of which is adapted to be brazed to a corresponding bar.

18. The stator according to claim 17, wherein the connector comprises a first insulating shell arranged about the elongated body and the fins.

19. The stator according to claim 18, wherein the connector comprises a second shell arranged about the first shell.

20. The stator according to claim 17, wherein the elongated body presents a slot which extends between the hole and the fins.

21. A stator of a turbo generator, comprising:
   a cylindrical core, which extends along a longitudinal axis and comprises a plurality of axial cavities and two opposite headers;
   connection terminals of the turbo generator;
   a plurality of electrical windings, which are split into groups and which extend along paths defined in part in the axial cavities and in part at the headers;
   the electrical windings of each group being isopotential and connected in parallel between a pair of terminals; and
   a plurality of connection devices including intermediate connecting device, each of which is adapted to define, at least at one of the headers, a segment of path in common with the isopotential electrical winding,
wherein each intermediate connection device comprises a hollow conductor and two connectors arranged on the two opposite ends of the hollow conductor.

22. The stator according to claim 21, wherein the intermediate connection device comprises two filters arranged on the opposite ends of the hollow conductor.

23. The stator according to claim 22, further comprising a suction tube connected to the hollow conductor at the middle line of the hollow conductor.

* * * * *